(12) United States Patent
Kitabatake et al.

(10) Patent No.: US 8,324,774 B2
(45) Date of Patent: Dec. 4, 2012

(54) ROTATING ELECTRICAL MACHINE APPARATUS

(75) Inventors: Hirotatsu Kitabatake, Susono (JP); Hiroaki Ebuchi, Susono (JP); Hideaki Komada, Gotenba (JP); Michinobu Suzuki, Susono (JP); Tomohito Ono, Susono (JP); Kensei Hata, Susono (JP)

(73) Assignee: Toyota Jidosha Kabushiki Kaisha, Aichi-ken (JP)

( * ) Notice: Subject to any disclaimer, the term of this patent is extended or adjusted under 35 U.S.C. 154(b) by 118 days.

(21) Appl. No.: 13/000,553

(22) PCT Filed: Oct. 9, 2009

(86) PCT No.: PCT/JP2009/067634
§ 371 (c)(1),
(2), (4) Date: Mar. 31, 2011

(87) PCT Pub. No.: WO2011/042985
PCT Pub. Date: Apr. 14, 2011

(65) Prior Publication Data
US 2011/0175473 A1    Jul. 21, 2011

(51) Int. Cl.
*H02K 7/00* (2006.01)
*F16D 65/14* (2006.01)
(52) U.S. Cl. .......... 310/77; 310/93; 188/171; 192/84.21
(58) Field of Classification Search .............. 310/77, 310/93; 192/84.21, 84.5; 188/171–173
See application file for complete search history.

(56) References Cited

U.S. PATENT DOCUMENTS

| 5,057,728 | A  | * | 10/1991 | Dammeyer et al. | 310/77 |
| 5,699,883 | A  | * | 12/1997 | Albrecht | 188/171 |
| 6,211,590 | B1 | * | 4/2001  | Albrecht et al. | 310/77 |
| 7,156,217 | B2 | * | 1/2007  | Raber | 192/84.6 |
| 2005/0250610 | A1 | * | 11/2005 | Fruehwald et al. | 475/149 |

FOREIGN PATENT DOCUMENTS

| JP | 09-156387 A | 6/1997 |
| JP | 2005-057941 A | 3/2005 |
| JP | 2005-318718 A | 11/2005 |
| JP | 2007-244027 A | 9/2007 |
| JP | 2008-259289 A | 10/2008 |

* cited by examiner

*Primary Examiner* — Tran Nguyen
(74) *Attorney, Agent, or Firm* — Sughrue Mion, PLLC

(57) ABSTRACT

A rotating electrical machine apparatus comprising a motor generator 10 having a stator (11) to which a plurality of coil groups are provided and a rotor (12), and a control apparatus (30) which controls a current supplied to the coil groups of the stator (11), wherein the stator (11) is provided with a stator friction portion (21) and the rotor (12) is provided with a rotor friction part (19), and the rotor (12) is movable between a connection position, in which the stator friction portion (21) and the rotor friction portion (19) are in contact with each other and the rotor (12) and the stator (11) are connected with each other, and a separation position, in which the stator friction portion (21) and the rotor friction portion (19) are separated from each other, and is constituted to move to the connection position when at least two coil groups among the plurality of coil groups are simultaneously excited, and the control apparatus (30) controls a current supplied to the coil groups so that at least two coil groups among the plurality of coil groups are simultaneously excited when prescribed connection condition is fulfilled.

14 Claims, 14 Drawing Sheets

ROTATING ELECTRICAL MACHINE APPARATUS

TECHNICAL FIELD

The present invention relates to a rotating electrical machine apparatus comprising a polyphase rotating electrical machine having a stator to which a plurality of coil groups are provided and a rotor.

BACKGROUND ART

An axial air gap motor in which a stator and a rotor are aligned in a rotation axis direction is known. Among such motors, a motor is known in which the rotor and the stator are arranged such that they are relatively movable with each other, and a cam mechanism which changes the distance between the rotor and the stator using the torque of the rotor is provided (refer to Patent Document 1). In addition, there are Patent Documents 2 and 3 as prior art references in relation to the present invention.

Citation List

Patent Literature

Patent Document 1: JP-A-2007-244027
Patent Document 2: JP-A-09--156387
Patent Document 3: JP-A-2008-259289

SUMMARY OF INVENTION

Technical Problem

In a motor in which the rotor and stator are arranged such that they are relatively movable with each other, the rotor can be locked by contacting the rotor and the stator with each other. However, in the motor described in Patent Document 1, the distance between the rotor and the stator is changed depending on the torque of the rotor. Therefore, in a case that the torque of the rotor has not reached the torque necessary for changing the distance between the rotor and the stator, the distance cannot be changed and the rotor cannot be locked. In a case that an actuator is used instead of a cam mechanism to change the distance between the rotor and the stator, it is necessary to provide the actuator, thus the size of the apparatus may become large.

In view of the foregoing, one object of the present invention is to provide a rotating electrical machine apparatus which can lock the rotor with a comparatively simple mechanism and is advantageous to downsizing.

Solution of Problem

A rotating electrical machine apparatus of the present invention includes a polyphase rotating electrical machine having a stator to which a plurality of coil groups are provided and a rotor provided coaxially with the stator, and a control device which controls a current supplied to the coil groups of the stator, wherein a portion of the stator, which faces the rotor, is provided with a stator friction portion, and a portion of the rotor, which faces the stator, is provided with a rotor friction portion, the rotor is movable between a connection position, in which the stator friction portion and the rotor friction portion are in contact with each other and the rotor and the stator are connected with each other, and a separation position, in which the stator friction portion and the rotor friction portion are separated from each other, and the rotor is provided to move to the connection position when at least two coil groups among the plurality of coil groups are simultaneously excited, and the control device comprises a rotor position control device which controls a current supplied to the coil groups so that at least two coil groups among the plurality of coil groups are simultaneously excited when prescribed connection condition is fulfilled.

According to the rotating electrical machine apparatus of the present invention, by moving the rotor to the connection position and contacting the stator friction portion and the rotor friction portion with each other, the rotor is locked by the frictional force generated between these two friction portions. Therefore, it is not necessary to provide a new mechanism for locking the rotor. Further, the rotor can be moved to the connection position by exciting at least two coil groups among the plurality of coil groups. Therefore, it is not necessary to provide a new mechanism for moving the rotor. Thus, according to the rotating electrical machine apparatus of the present invention, the rotor can be locked with a comparatively simple constitution, and it is possible to downsize the apparatus.

In one embodiment of the rotating electrical machine apparatus of the present invention, a spring device may be further provided for pushing the rotor in a direction away from the stator so that the rotor moves to the separation position. In this case, the rotor and the stator can be easily separated from each other.

In one embodiment of the rotating electrical machine apparatus of the present invention, the spring device may push the rotor in a direction away from the stator with an elastic force which is stronger than the magnetic force generated when one coil group among the plurality of coil groups is excited, and weaker than the magnetic force generated when three coil groups among the plurality of coil groups are excited. By setting the elastic force of the spring device in this way, the rotor can be more reliably prevented from moving to the connection position when the rotating electrical machine is made to function as an electric motor. Therefore, by controlling the current supplied to the plurality of coil groups, the rotating electrical machine can be made to function as an electric motor, and be made to function as a clutch.

In one embodiment of the rotating electrical machine apparatus of the present invention, the polyphase rotating electrical machine may be an axial air gap rotating electrical machine in which the stator and the rotor are aligned in a rotation axis direction of the rotor. In this case, the distance between the stator and the rotor can be easily adjusted by enabling the rotor to be moved in the rotation axis direction.

In one embodiment of the rotating electrical machine apparatus of the present invention, the rotor may include a connection assisting device which uses the torque in a prescribed direction generated by the rotor after it moves to the connection position from the separation position to generate a force in a direction which presses the rotor friction portion to the stator friction portion.

In this case, after the rotor moves to the connection position, the rotor position can be maintained in the connection position using the force of the connection assisting device as well. Therefore, after the rotor is moved to the connection position, the current supplied to the coil groups of the stator can be reduced. Thereby, unnecessary energy consumption can be suppressed.

In one embodiment of the rotating electrical machine apparatus of the present invention, the polyphase rotating electrical machine may be provided to a driving apparatus for transmitting power of an internal combustion engine to driving wheels of a vehicle so that it can generate a counterforce necessary for transmitting the power of the internal combustion engine to the driving wheels, and the rotor position control device determines that the prescribed connection condition is fulfilled in a case that the counterforce is equal to or greater than an upper limit value of an output of the polyphase rotating electrical machine. By switching the position of the rotor in this way, a counterforce which is equal to or greater than the upper limit value of the output of the polyphase rotating electrical machine can be received by the polyphase rotating electrical machine.

The rotating electrical machine apparatus of the present invention can be incorporated into a driving apparatus of various hybrid vehicles. Therefore, the vehicle may be a parallel-type hybrid vehicle in which the internal combustion engine and an electric motor are installed as power sources for driving, and the driving wheels can be driven by each of the power sources. Further, the vehicle may also be a power split type hybrid vehicle, in which the internal combustion engine and an electric motor are installed as power sources, and the vehicle comprises a power split mechanism capable of splitting the power of the internal combustion engine to the polyphase rotating electrical machine and the driving wheels, and the driving wheels can be driven by each of the power split by the power split mechanism and the power of the electric motor.

DESCRIPTION OF EMBODIMENTS

Figure 1:
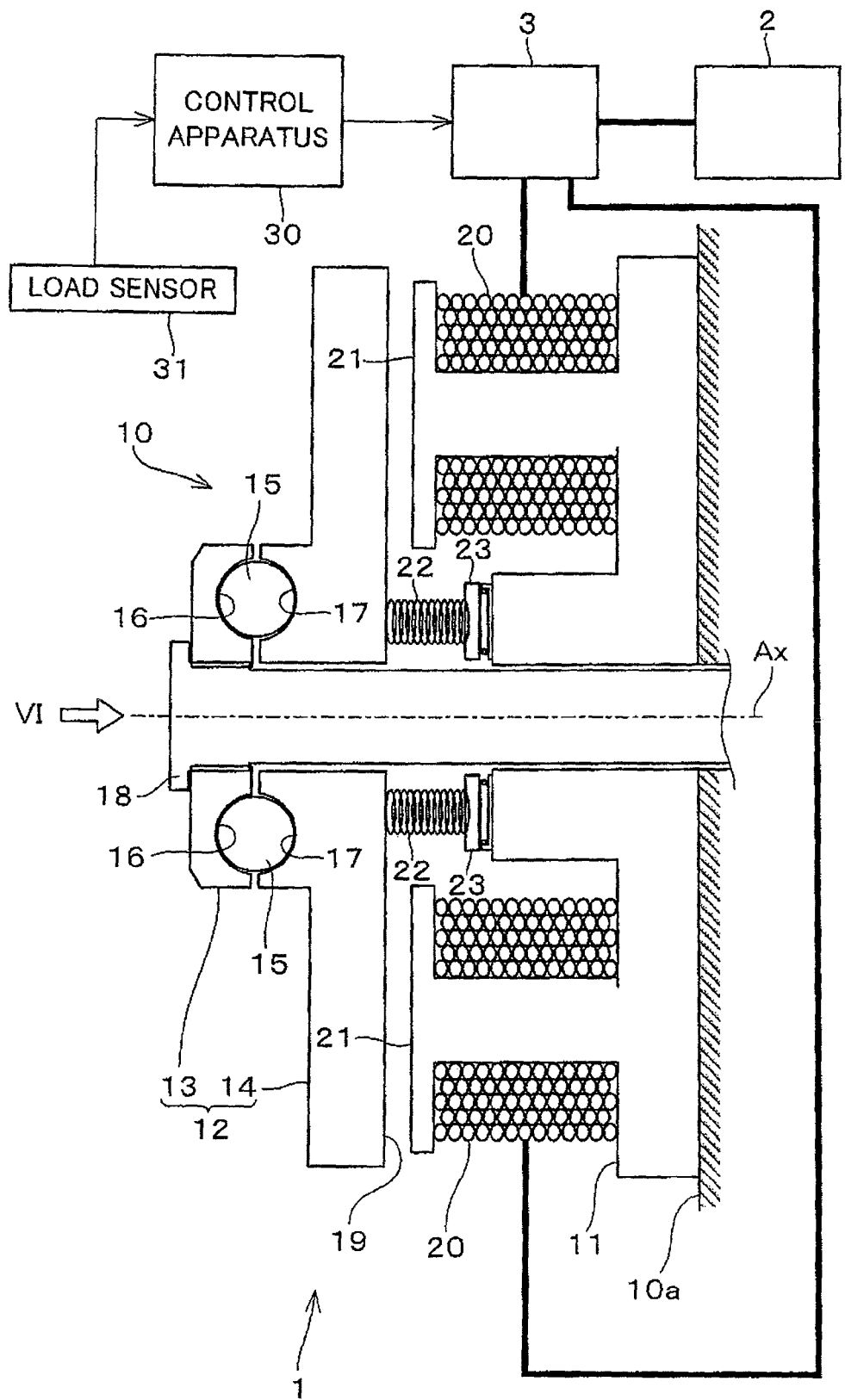
FIG. 1 is a view showing a rotating electrical machine apparatus according to one embodiment of the present invention.
Figure 2:
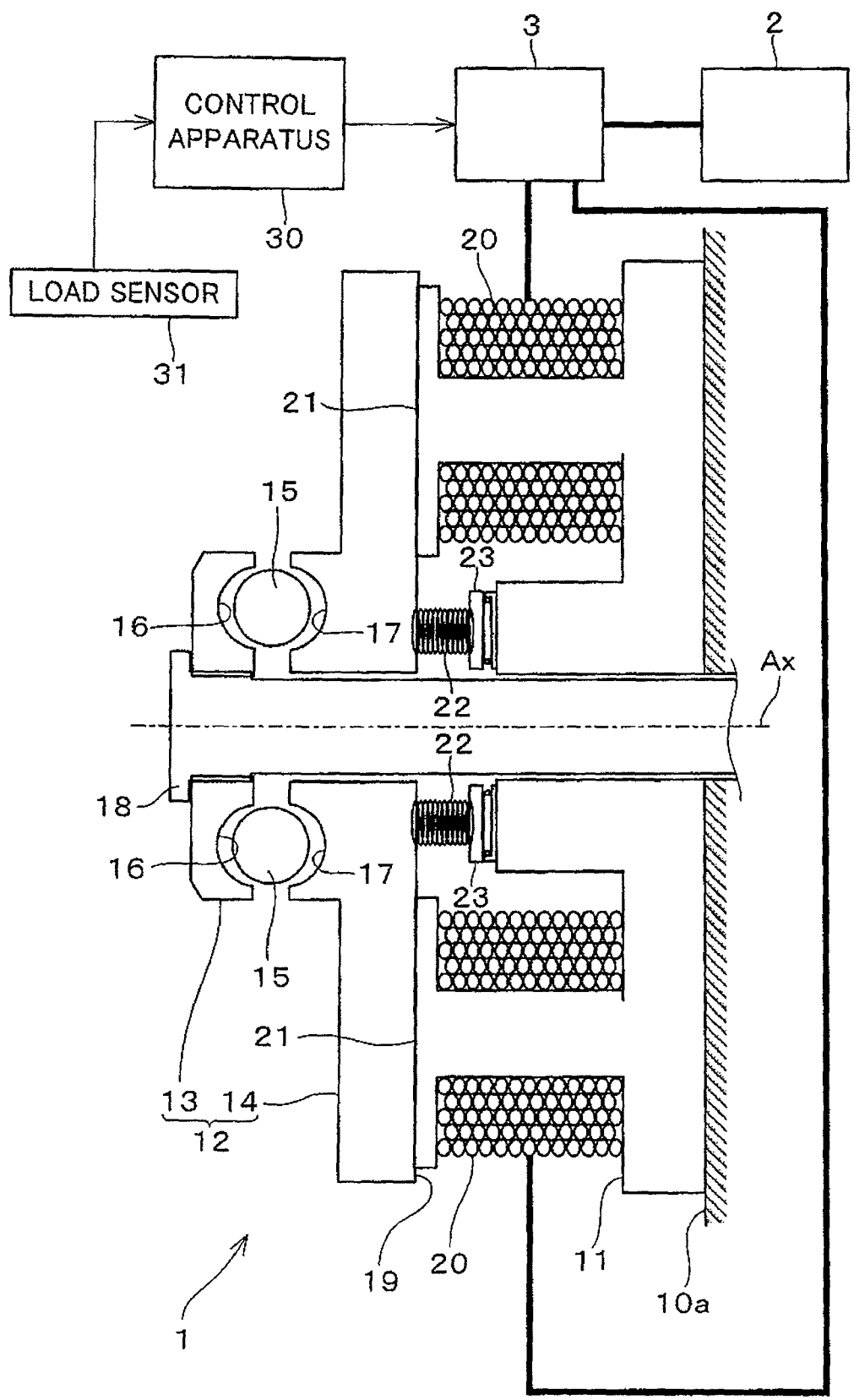
FIG. 2 is a view showing the rotating electrical machine apparatus when a position of a second clutch plate is a connection position.

FIGS. 1 and 2 show the rotating electrical machine apparatus according to one embodiment of the present invention. The rotating electrical machine apparatus 1 includes a motor generator (hereinafter may be referred to as "MG") 10 serving as a rotating electrical machine which functions as an electric motor and a generator, and a battery 2. The MG 10 is configured as a three-phase induction motor generator, and includes a stator 11 and a rotor 12. As shown in FIG. 1, the stator 11 and rotor 12 are arranged to be aligned in the direction of an axis Ax. Therefore, the MG 10 is an axial air gap motor generator. The stator 11 is fixed so that it cannot rotate to a case 10a in which the MG 10 is housed.

As shown in FIG. 1, the rotor 12 includes a first clutch plate 13, a second clutch plate 14, and a spherical cam ball 15 interposed between the clutch plates 13 and 14. The first clutch plate 13 and the second clutch plate 14 are arranged to be facing each other on the same axis. The clutch plates 13 and 14 are configured in a circular disc form, and V-shaped grooves 16 and 17 which hold the cam ball 15 are formed on opposing faces of the clutch plates 13 and 14. The first clutch plate 13 is provided on one end of a rotation shaft 18 so that it rotates integrally with the rotation shaft 18. Although omitted from the drawings, the other end of the rotation shaft 18 is connected to a control object whose operating condition is controlled by the MG 10. The second clutch plate 14 is provided on the rotation shaft 18 so that it can move in the direction of the axis Ax between a connection position in which it is in contact with the stator 11 as shown in FIG. 2 and a separation position in which it is separated from the stator 11 as shown in FIG. 1. The second clutch plate 14 is supported on the rotation shaft 18 so that it can relatively rotate with respect to the rotation shaft 18. The second clutch plate 14 is mode of a magnetic material. Within the second clutch plate 14, a rotor friction portion 19 is provided on the portion which is faced to the stator 11.

Figure 3:
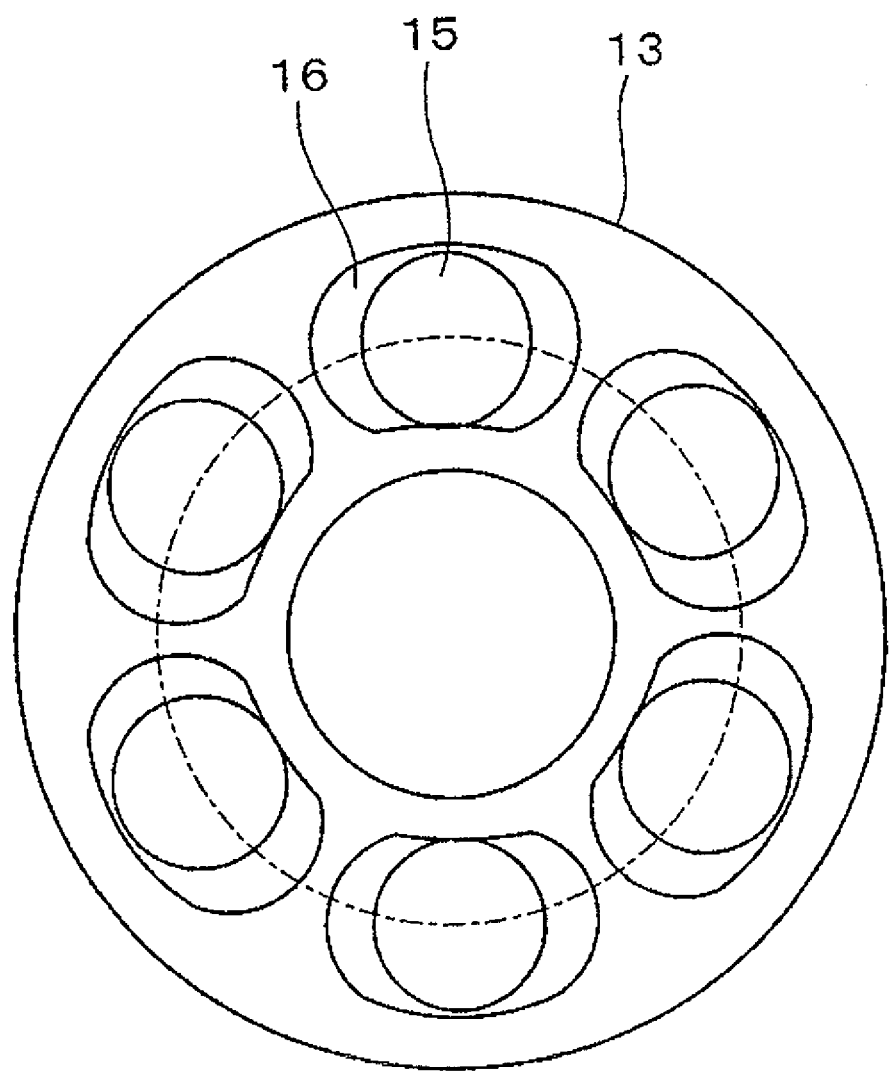
FIG. 3 is a view showing a first clutch plate is observed from an axial direction.
Figure 4:
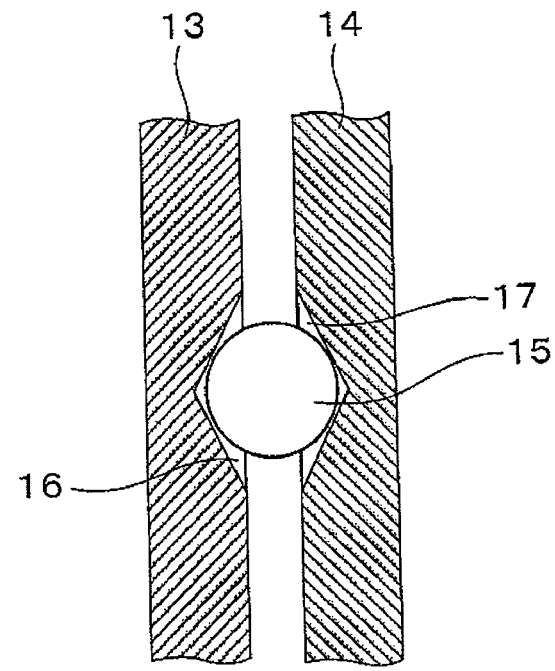
FIG. 4 is a view showing a state in which the clutch plates are observed from the radial direction, and showing the state in which the phases of the clutch plates coincide with each other.
Figure 5:
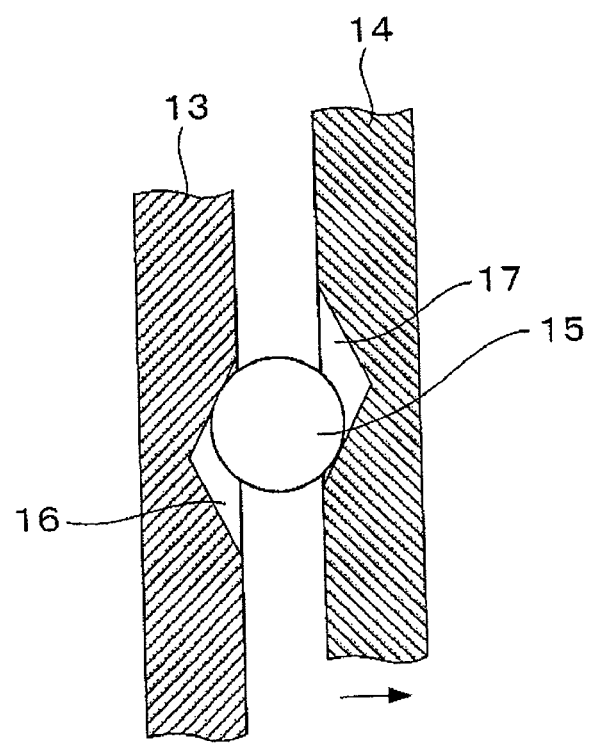
FIG. 5 is a view showing the state in which the clutch plates are observed from the radial direction, and showing the state in which the phases of the clutch plates are offset from each other.

FIG. 3 shows a state in which the first clutch plate 13 is observed from the axial direction. FIGS. 4 and 5 show a state in which the clutch plates 13 and 14 are observed from the radial direction. FIG. 4 shows a state in which the phases of the clutch plates 13 and 14 coincide with each other, and FIG. 5 shows a state in which the phases of the clutch plates 13 and 14 are offset from each other. As is clear from FIG. 3, a plurality (six in FIG. 3) of V-shaped grooves 16 are provided on the first clutch plate 13. These V-shaped grooves 16 are aligned at equal intervals in the circumferential direction. The same number of V-shaped grooves 17 as the number of V-shaped grooves 16 of the first clutch plate 13 is provided to the second clutch plate 14. These V-shaped grooves 17 are similarly aligned at equal intervals in the circumferential direction. The V-shaped grooves 16 and 17 have a semicircular cross-section when cut at a cross-section including the center line of the first clutch plate 13 (see FIGS. 1 and 2). As shown in FIG. 3, when viewed from the axial direction of the first clutch plate 15, the V-shaped grooves 16 and 17 are curved so that the inside edge toward the center of the first clutch plate 13 and the outside edge away from the center form concentric arcs. Further, as shown in FIGS. 4 and 5, when viewed from the radial direction of the first clutch plate 13, the V-shaped grooves 16 and 17 are formed in a V-shape, and their depth becomes gradually shallower with respect to the rotation direction (top or bottom direction in the drawings).

Figure 6:
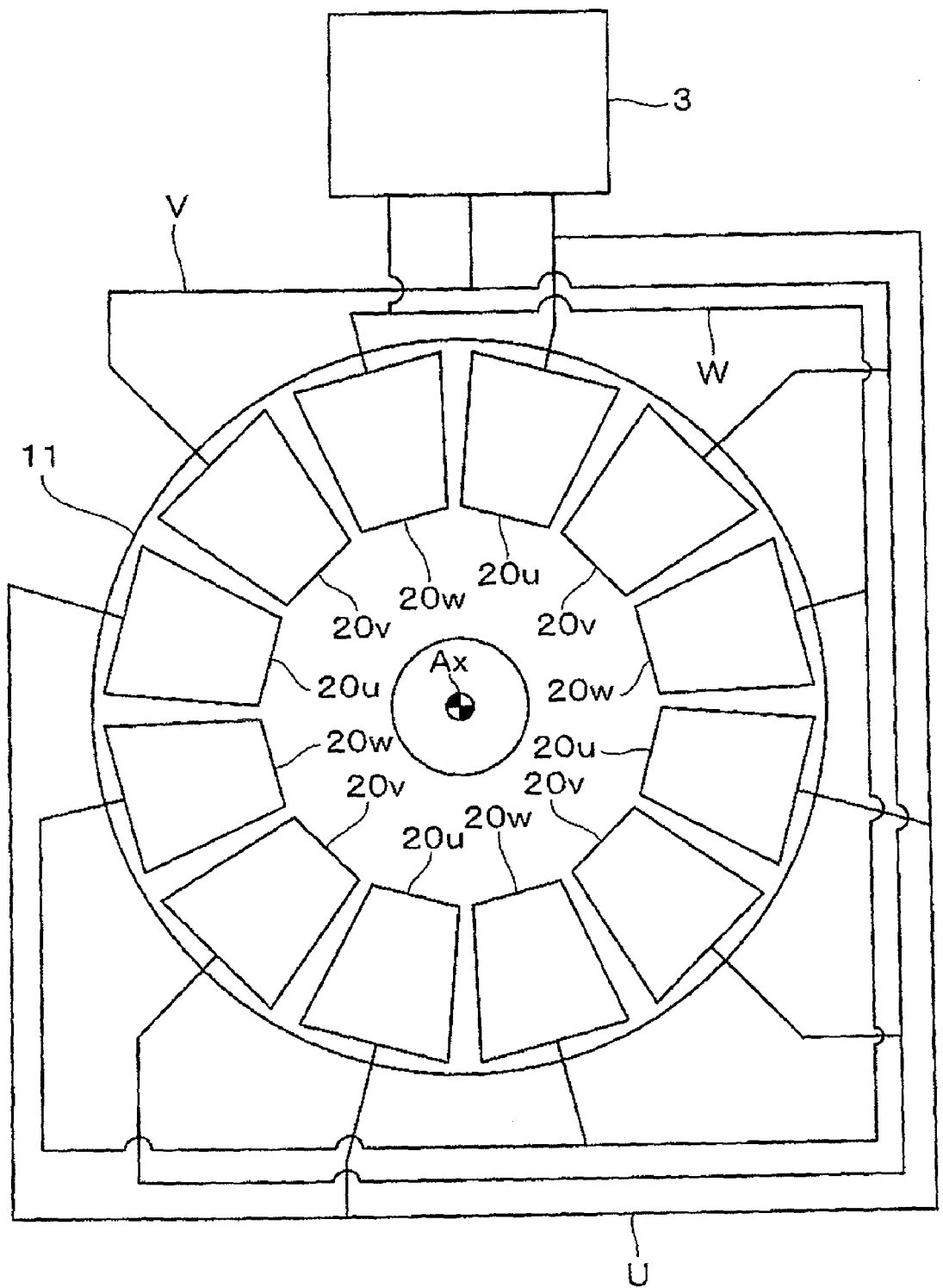
FIG. 6 is a view showing a stator is observed from the direction of an arrow VI of FIG. 2.

FIG. 6 is a view of the stator 11 when viewed from the direction of the arrow VI in FIG. 1. As shown in FIG. 6, a plurality (12 in FIG. 6) of coils 20 are provided on the stator 11. The plurality of coils 20 are aligned at equal intervals on a common circumference. A first wiring U is connected to one third of the plurality of coils 20. A second wiring V is connected to another one third of the plurality of coils 20. A third wiring W is connected to the remaining one third of the plurality of coils 20. Hereinafter, the four coils to which the first wiring U is connected may be referred to as first coils 20u. The four first coils 20u may be collectively referred to as a first coil group. Similarly, the four coils to which the second wiring V is connected may be referred to as second coils 20v, and the four coils to which the third wiring W is connected may be referred to as third coils 20w. The four second coils 20v may be collectively referred to as a second coil group, and the four third coils 20w may be collectively referred to as a third coil group. As shown in FIG. 6, the plurality of coils 20 are arranged so as to be aligned in the order of the first coil 20u, the second coil 20v, and the third coil 20w. As shown in FIG. 2, a stator friction portion 21 is provided to the end of each coil 20 on the rotor 12 side.

As shown in FIG. 1, a return spring 22 is provided between the second clutch plate 14 of the rotor 12 and the stator 11 as a spring device for pushing the second clutch plate 14 in a direction away from the stator 11. The return spring 22 pushes the second clutch 14 with a stronger elastic force than a magnetic force generated when one coil group among the first to third coil groups of the stator 11 is excited, and with a weaker elastic force than a magnetic force generated when two coil groups among the first to third coil groups are excited. One end of the return spring 22 is fixed to the second clutch plate 14. As shown in FIG. 1, a bearing 23 which can rotate around the axis Ax is provided on the stator 11. The other end of the return spring 22 is attached to the bearing 23. Therefore, when the second clutch plate 14 is in the separation position, the second clutch plate 14 can relatively rotate with respect to the stator 11.

As shown in FIG. 1, the MG 10 is connected to the battery 2 via an inverter 3. The battery 2 is a publicly known battery capable of supplying electric power to the MG 10 and storing electric power generated by the MG 10. The inverter 3 is a power conversion apparatus capable of converting direct current of the battery 2 to three-phase alternating current. The inverter 3 is configured to be capable of controlling the alternating current of each phase of the three-phase alternating current which has been converted. As shown in FIG. 6, the MG and the inverter 3 are connected with the first to third wirings U, V and W. These wirings U, V and W are connected to the inverter 3 so that the phase of the current of the three-phase alternating current which flows in each wiring is different from the others.

The operation of the MG 10 is controlled by a control apparatus 30 serving as a control device. The control apparatus 30 controls the inverter 3 to control the current supplied to the wirings U, V and W, and thereby controls the operation of the MG 10. The control apparatus 30 is configured as a computer unit including a microprocessor and peripheral devices required to their operation such as RAM, ROM, and the like. The control apparatus 30 controls the operation of the MG 10 in accordance with the operating condition of the control object. Various sensors for acquiring the operating condition of the control object are connected to the control apparatus 30. For example, a load sensor 31 is connected which outputs a signal corresponding to a physical quantity correlated to a load applied to the rotation shaft 18 from the control object.

Figure 7:
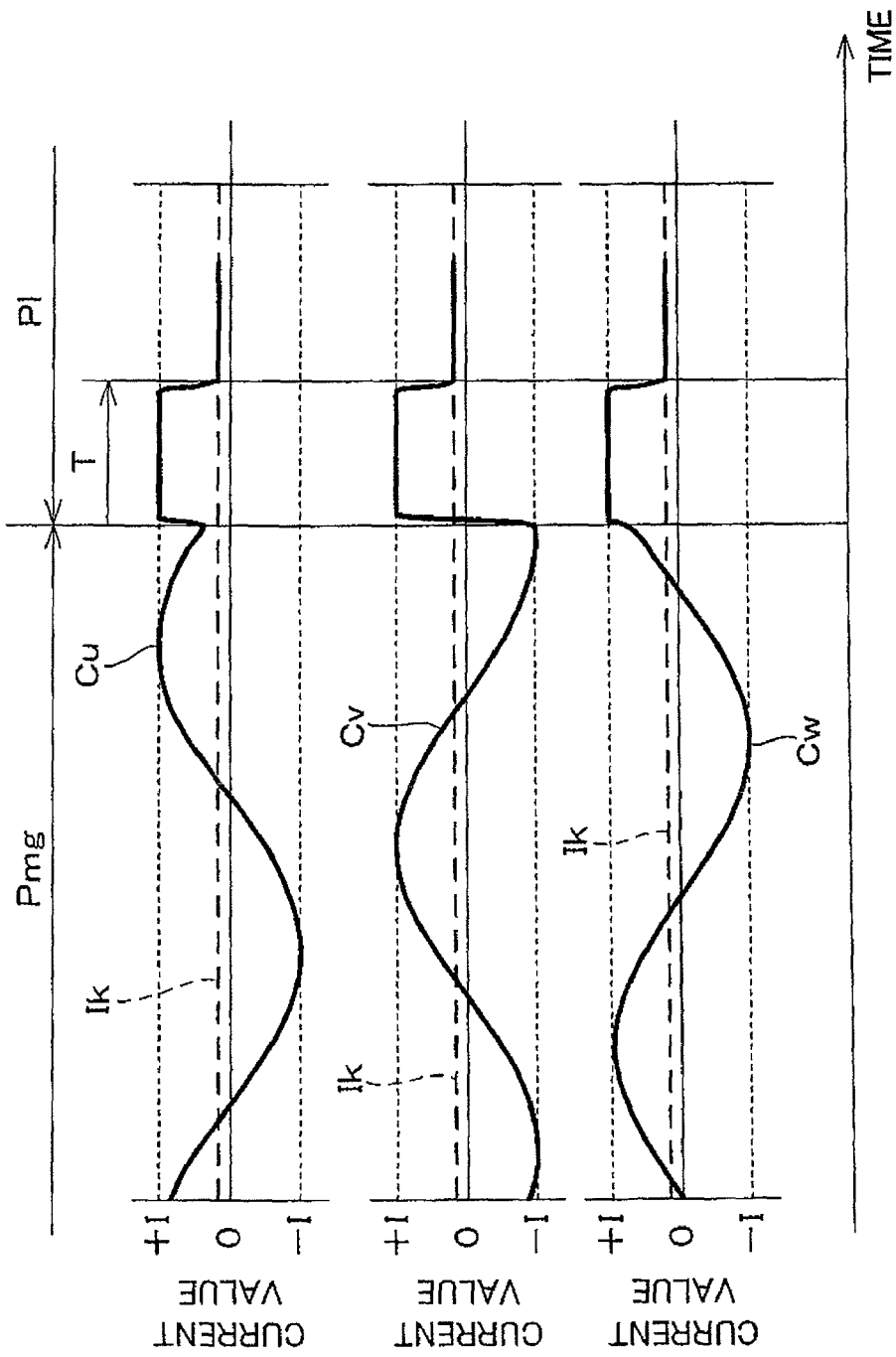
FIG. 7 is a graph showing a time change of a current value of each wiring when an MG operation mode is switched from an MG mode to a lock mode.

The control apparatus 30 switches the operation mode of the MG 10 in accordance with the operating condition of the control object between an MG mode, in which the rotor 12 is in a rotatable state and the MG10 is made to function as an electric motor or a generator, and a lock mode in which the rotor 12 is locked so that it cannot rotate. These operation modes will be explained with reference to FIGS. 1, 2 and 7. FIG. 7 shows the time change of the current values of the wirings U, V and W when the operation mode of the MG 10 is switched from the MG mode to the lock mode. Line Cu in FIG. 7 shows the current of the first wiring U, line Cv shows the current of the second wiring V, and line Cw shows the current of the third wiring W.

First, the MG mode will be explained. Here, a case in which the MG 10 is made to function as an electric motor in the MG mode will be explained. In FIG. 7, a duration Pmg shows the time change of the current values of the wirings U, V and W in the MG mode. As shown in FIG. 7, in the MG mode, a three-phase alternating current whose current value changes between a maximum value +I to a minimum value −I is supplied from the inverter 3 to the MG 10. Thereby, the first to third coil groups become excited in a prescribed order in a prescribed period. In this case, since only the magnetic force of one coil group is generated in the stator 11, the magnetic force generated by the stator 11 is weaker than the elastic force of the return spring 22. Therefore, as shown in FIG. 1, the position of the second clutch plate 14 is the separation position. In this condition, the rotor 12 can relatively rotate with respect to the stator 11. Since the return spring 22 presses the second clutch plate 14 to the first clutch plate 13, the first clutch plate 13 and the second clutch plate 14 rotate together. Therefore, the rotor 12 can be rotated by exciting the coil groups in order. Thereby, the MG 10 functions as an electric motor. At this time, the number of rotations and the rotation direction of the rotor 12 are both controlled, but this control method may be a publicly-known method for controlling the number of rotations and the rotation direction of a three-phase induction motor with an inverter, thus a detailed explanation will be omitted.

Next, the lock mode will be explained. In FIG. 7, a duration P1 shows the time change of the current values of the wirings U, V and W in the lock mode. As shown in FIG. 7, in the lock mode, a current of the same size is supplied to each of the wirings U, V and W from the inverter 3. At this time, as shown in FIG. 7, a current of a maximum value +I when a three-phase alternating current is supplied is first supplied to each of the wirings U, V and W. Thereby, the coils 20 of the three coil groups of the stator 11, i.e. all of the coils 20 of the stator 11, are excited. Therefore, as shown in FIG. 2, the second clutch plate 14 opposes the return spring 22 and moves to the connection position, and the rotor friction portion 19 and the stator friction portion 21 contact each other. In this condition, when torque acts on the first clutch plate 13, as shown in FIG. 5, the phases of the clutch plates 13 and 14, are offset from each other, and thereby the cam ball 15 moves to a shallow position of the V-shaped grooves 16 and 17, and a force which presses the second clutch plate 14 to the stator 11 is generated. Therefore, even if the magnetic force generated by the coil groups is weakened, the position of the second clutch plate 14 is maintained in the connection position. Thus, in the lock mode, at a time when a prescribed time T has passed since the mode was switched, the current values of the wirings U, V and W are lowered to a maintenance current value Ik. For the maintenance current value Ik, an appropriate current value capable of maintaining the position of the second clutch plate 14 in the connection position by the magnetic force generated by the coil groups may be set. In this way, in the lock mode, since the rotor 12 is maintained in the connection position, the rotor 12 is locked with the friction between the rotor friction portion 19 and the stator friction portion 21. By generating a pressing force in this way, the first clutch plate 13, the second clutch plate 14, and the cam ball 15 function as a connection assisting device of the present invention.

Figure 8:
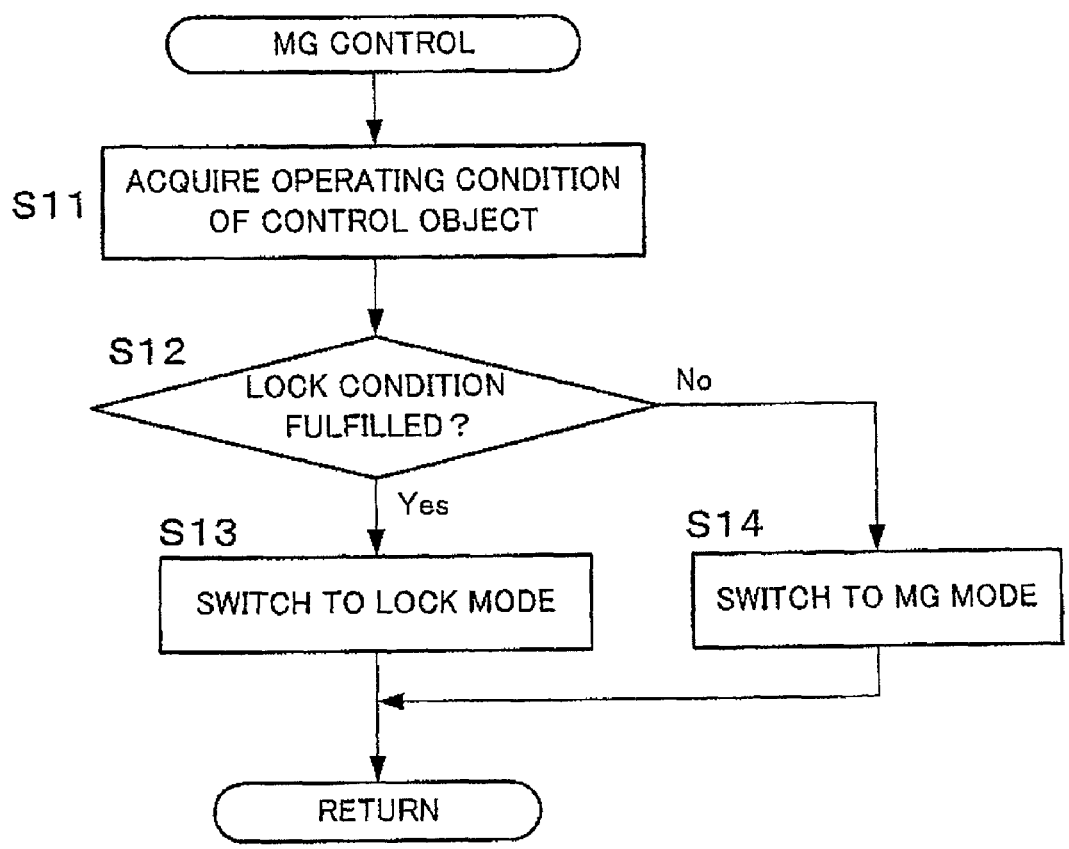
FIG. 8 is a flowchart showing an MG control routine executed by a control apparatus.

FIG. 8 shows an MG control routine which is repeatedly executed by the control apparatus 30 in a prescribed period in order that the operation mode of the MG 10 should be switched in accordance with the operating condition of the control object. By executing this control routine, the control apparatus 30 functions as a rotor position control device of the present invention. In this control routine, first at step S11, the control apparatus 30 acquires an operating condition of the control object. For example, the control apparatus 30 acquires a load applied to the rotation shaft 18 from the control object as the operating condition. In next step S12, the control apparatus 30 determines whether or not a prescribed lock condition to switch the operation mode of the MG 10 to the lock made is fulfilled. If the load applied to the rotation shaft 18 is too large, the load may not be able to be handled with the output torque when the MG 10 is made to function as an electric motor. Thus, it is determined that the lock condition is fulfilled when, for example, the load applied to the rotation shaft 18 is larger than a preset prescribed value. Alternatively, it is determined that the lock condition is fulfilled when, for example, a rotating member driven by the rotation shaft 18 among the members constituting the control object is to be maintained in a stopped condition.

When the control apparatus 30 determines that the lock condition is fulfilled, the process advances to step S13, and the control apparatus 30 switches the operation mode of the MG 10 to the lock mode. In the case that the operation mode has already been switched to the lock mode, the control apparatus 30 maintains the mode. Thereafter, the control apparatus 30 ends the MG control routine. On the other hand, when the control apparatus 30 determines that the lock condition is not fulfilled, the process advances to step S14, and the control apparatus 30 switches the operation mode of the MG 10 to the MG mode. In the case that the operation mode has already been switched to the MG mode, the control apparatus 30 maintains the mode. Thereafter, the control apparatus 30 ends the MG control routine.

As explained above, in the MG 10 of the present invention, the rotor 12 and the stator 11 are contacted with each other, and the rotor 12 can be locked with the friction between the rotor friction portion 19 and the stator friction portion 21. In this case, it is not necessary to provide a new member for locking the rotor 12 so that it cannot rotate, and therefore, the rotor 12 can be locked with a comparatively simple mechanism. In the MG 10, the position of the second clutch plate 14 is switched by the excitation of the coils 20 of the stator 11. In this case, since it is not necessary to provide a new power source for moving the second clutch plate 14, it is possible to downsize the MG 10.

In the MG 10, since a return spring 22 is provided between the stator 11 and the rotor 12, the second clutch plate 14 can be easily returned to the separation position. The elastic force of the return spring 22 is stronger than the magnetic force when one coil group is excited, and weaker than the magnetic force when two coil groups are excited. Therefore, even if a three-phase alternating current is supplied to the MG 10, the second clutch plate 14 will not move to the connection position. Accordingly, the MG 10 can be made to function as an electric motor. On the other hand, in the case that current is supplied to the MG 10 so that all of the coils 20 of the stator 11 are excited, the second clutch plate 14 moves to the connection position, thus the rotor 12 can be locked. In this way, the MG 10 can be used as both an electric motor and a lock mechanism by controlling the current supplied to the MG 10.

As shown in FIG. 1, the MG 10 is an axial air gap motor generator in which the stator 11 and the rotor 12 are aligned in the direction of the axis Ax. Therefore, by making the rotor 12 movable in the direction of the axis Ax, the distance between the stator 11 and the rotor 12 can be easily changed.

In the MG 10, as shown in FIG. 5, by offsetting the phases of the clutch plates 13 and 14, a force which presses the second clutch plate 14 to the stator 11 can be generated. Thereby, after the second clutch plate 14 is moved to the connection position, the current value supplied to the MG 10 can be lowered, thus the energy consumed in the lock mode can be reduced.

In the aforementioned embodiment, the rotor 12 was locked so that it cannot rotate in the lock mode. However, in the lock mode, the rotor 12 can be contacted to the stator 11 and the MG 10 can be made to function as an electric motor. For example, in the case that the load applied to the rotation shaft 18 is larger than the frictional force generated between the rotor friction portion 19 and the stator friction portion 21, the rotor 12 may not be able to be maintained in a stopped condition with only the frictional force. Thus, in such a case, the MG 10 is made to function as an electric motor while the rotor 12 is maintained in the connection position. Thereby, the load applied to the rotation shaft 18 can be received using the power output from the MG 10 in addition to the frictional force between the friction portions 19 and 21. Further, if a load which is larger than the frictional force between the friction portions 19 and 21 is applied to the rotation shaft 18 and there are cases in which the first clutch plate 13 is rotated in a direction in which the phases of the clutch plates 13 and 14 coincide with each other. In such a case, a gap is generated between the cam ball 15 and the V-shaped grooves 16 and 17, and the force which presses the second clutch plate 14 to the stator 11 which is generated between the clutch plates 13 and 14 becomes weak. Thus, this gap may be eliminated by making the MG 10 function as an electric motor and rotating the second clutch plate 14.

Figure 9:
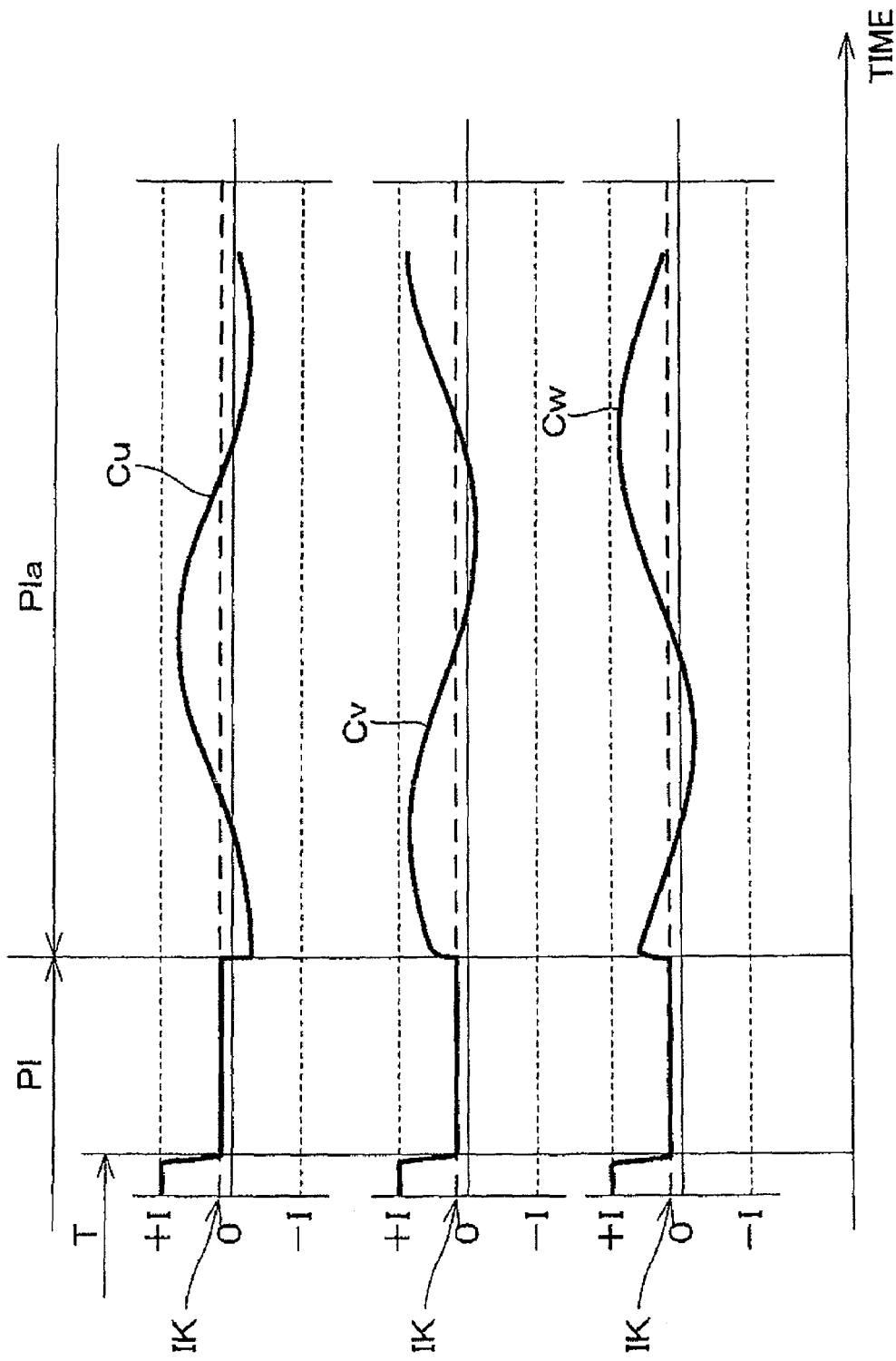
FIG. 9 is a graph showing a time change of a current value of each wiring when an MG operation mode is switched from a lock mode to a lock assisting mode.

Referring to FIG. 9, a control method of the MG 10 in the case that the MG 10 is made to function as an electric motor while the rotor 12 is maintained in the connection position will be explained. Hereinafter, an operation mode in which the MG 10 is made to function as an electric motor while the rotor 12 is maintained in the connection position will be referred to as a lock assisting mode. FIG. 9 shows the time change of the current values of the wirings U, V and W when the operation mode of the MG 10 is switched from the lock mode to the lock assisting mode. In FIG. 9, in a similar manner to FIG. 7, line Cu shows the current of the first wiring U, line Cv shows the current of the second wiring V, and line Cw shows the current of the third wiring W. In FIG. 9, a duration Pla after a time To shows the time change of the current values of the wirings U, V and W in the lock assisting mode. As shown in FIG. 9, in the lock assisting mode, a three-phase alternating current is supplied from the inverter 3 to the MG 10. However, in the three-phase alternating current supplied in the lock assisting mode, each alternating current is offset so that a sum of the currents of each phase becomes a current value Ik. In other words, as shown in FIG. 9, the reference currents of the alternating currents are each modified to the current value Ik. Thereby, a magnetic force capable of maintaining the second clutch plate 14 in the connection position can be generated from the stator 11 while the coil groups are excited in a prescribed order. Therefore, the MG 10 can be made to function as an electric motor while the second clutch plate 14 is maintained in the connection position.

Figure 10:
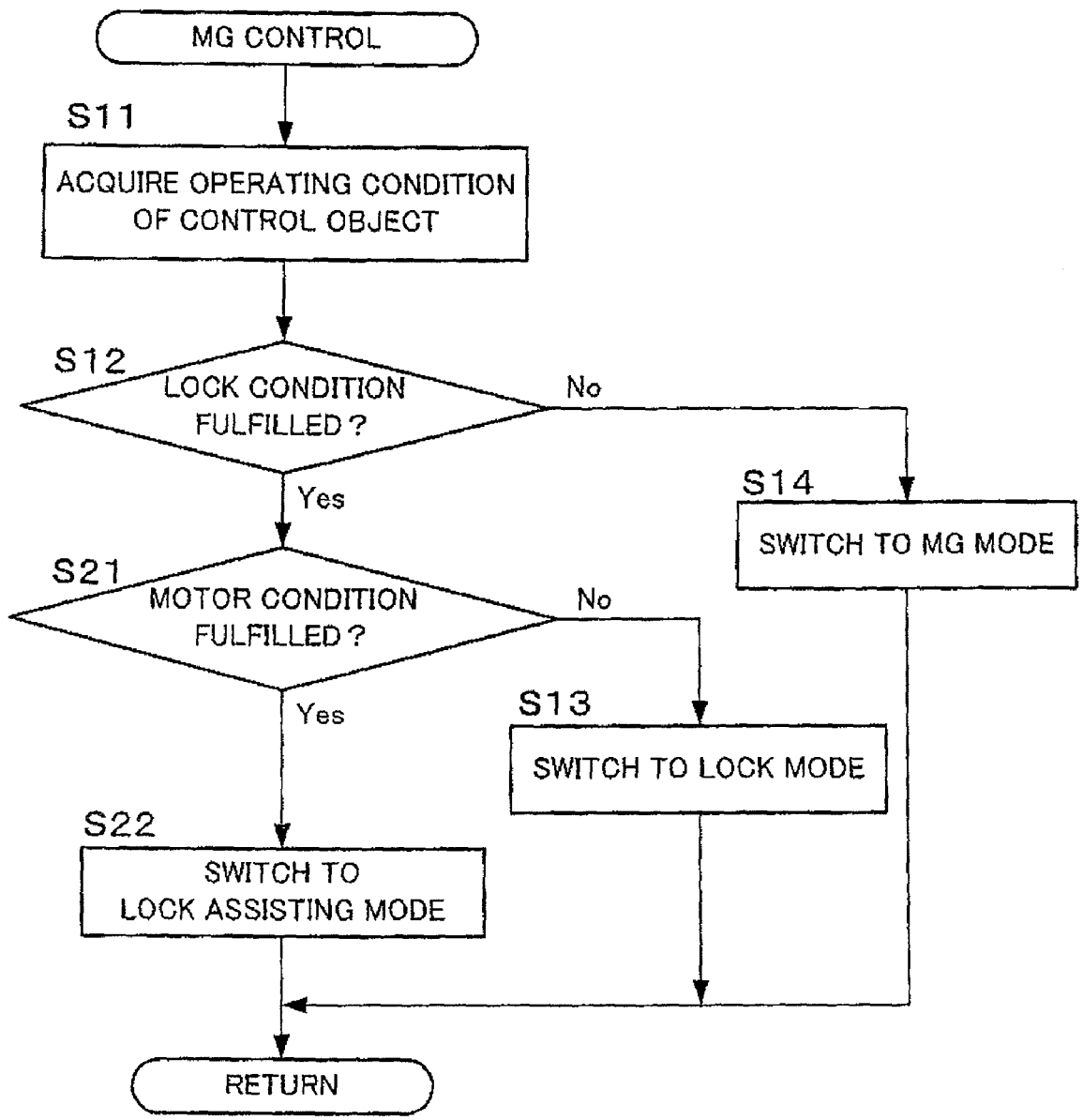
FIG. 10 is a flowchart showing a variation of the MG control routine.

FIG. 10 shows a variation of the MG control routine. This variation differs from the MG control routine of FIG. 8 in that steps S21 and S22 have been added, but the other steps are same as those in FIG. 8. Thus, same processes as those in FIG. 8 have same reference numbers and explanations thereof will be omitted. In the control routine of FIG. 10, the control apparatus 30 processes in a similar manner to the control routine of FIG. 8 up to step S12. In step S12, when the control apparatus 30 determines that the lock condition is fulfilled, the process advances to step S21, and the control apparatus 30 determines whether or not a prescribed motor condition for making the MG 10 function as an electric motor while maintaining the rotor 12 in the connection position in fulfilled. As explained above, it is determined that the motor condition is fulfilled when, for example, the load applied to the rotation shaft 18 is larger than the frictional force between the friction portions 19 and 21, or when a gap is generated between the cam ball 15 and the V-shaped grooves 16 and 17.

When the control apparatus 30 determines that the motor condition is fulfilled, the process advances to step S21, and the control apparatus 30 switches the operation mode of the MG 10 to the lock assisting mode. In the case that the operation mode has already been switched to the lock assisting mode, the control apparatus 30 maintains the mode. Thereafter, the control apparatus 30 ends the MG control routine. On the other hand, when the control apparatus 30 determines that the motor condition is not fulfilled, the process advances to step S12, and the control apparatus 30 switches the operation mode of the MG 10 to the lock mode. Thereafter, the control apparatus 30 ends the MG control routine.

As explained above, in the case that a load which is larger than the frictional force between the friction portions 19 and 21 is applied to the rotation shaft 18, the load can be received by the MG 10 by switching the operation mode to the lock assisting mode. Therefore, the upper limit of the load which can be received by the MG 10 can be increased.

In the aforementioned embodiment, the MG 10 is made to function as an electric motor in the MG mode and the lock assisting mode. However, in the case that the rotation shaft 18 is received torque from the control object, the MG 10 may be made to function as a generator in these modes. Thereby, electric power is generated with the MG 10, and the battery 2 can be charged.

Figure 11:
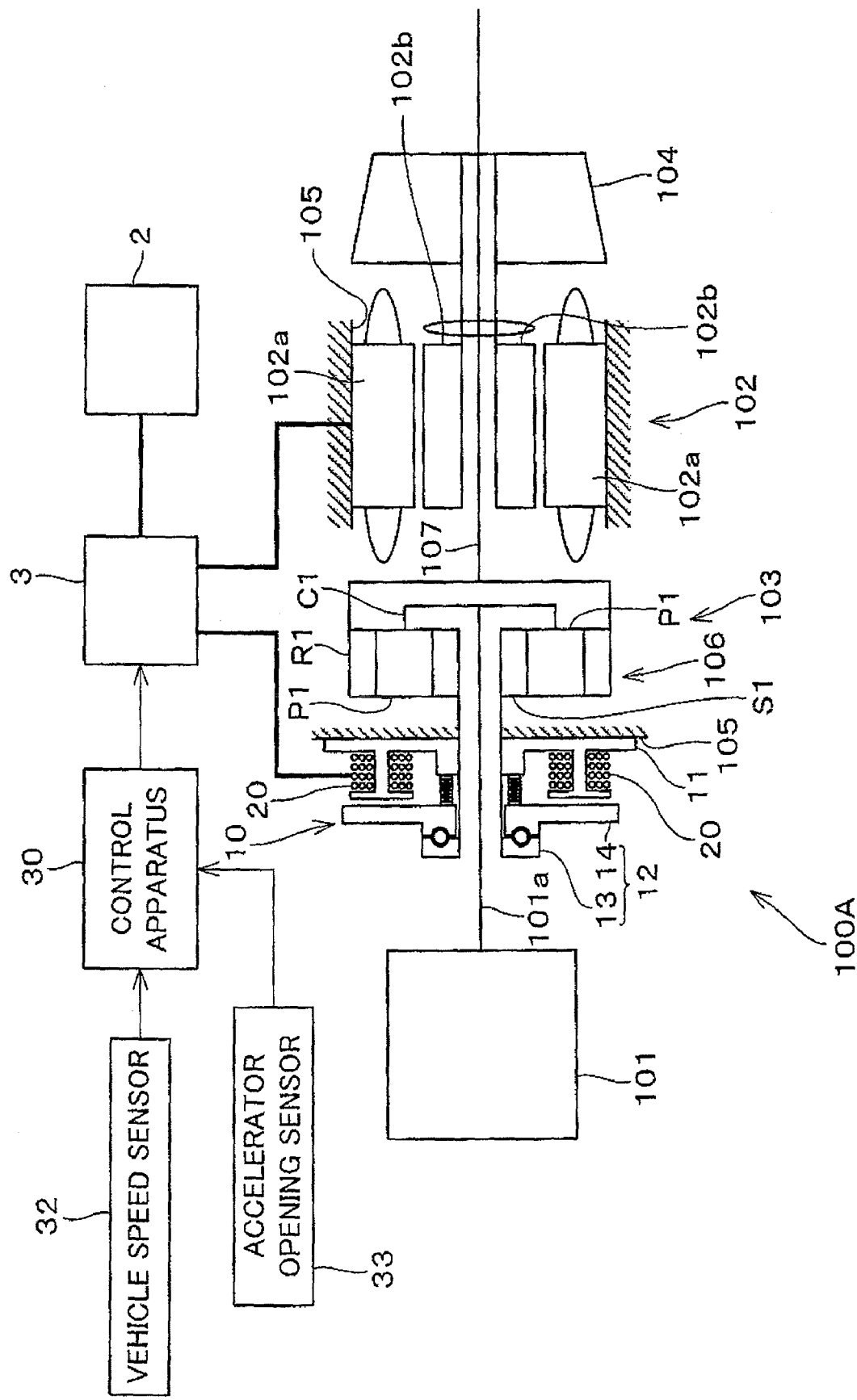
FIG. 11 is a view showing a first embodiment of a driving apparatus of a hybrid vehicle in which the rotating electrical machine apparatus of the present invention is incorporated.

Next, a driving apparatus of a hybrid vehicle in which the rotating electrical machine apparatus of the present invention is incorporated will be explained with reference to FIGS. 11 to 15. The same portions in FIGS. 11 to 15 as those in Figs, 1 to 6 have same reference numbers, and explanations thereof will be omitted. FIG. 11 schematically shows a driving apparatus 100A according to a first embodiment. The driving apparatus 100A is mounted in a hybrid vehicle, and includes an internal combustion engine 101, a first motor generator (MG) 10 as a rotating electrical machine, a second motor generator (MG) 102, a power split mechanism 103, and a transmission mechanism 104. The first MG 10, the second MG 102, the power transfer mechanism 103, and the transmission mechanism 104 are housed within a case 105. The second MG 102 includes a stator 102a fixed to the case 105 so that it cannot rotate, and a rotor 102b arranged coaxially on an inner peripheral side of the stator 102a. The second MG 102 is a well-known motor generator which is mounted in a hybrid vehicle and functions as an electric motor and a generator, thus a detailed explanation thereof will be omitted. The internal combustion engine 101 is also a well-known internal combustion engine which is mounted in a hybrid vehicle, thus a detailed explanation thereof will be omitted.

The internal combustion engine 101 and the first MG 10 are connected to the power split mechanism 103. The power split mechanism 103 includes a planetary gear mechanism 106. The planetary gear mechanism 106 includes a sun gear S1, which is an external gear, a ring gear R1, which is an internal gear, a plurality of pinion gears P1, and a carrier C1. The sun gear S1 and the ring gear R1 are arranged coaxially so that their teeth face each other. The plurality of pinion gears P1 are disposed so that they engage with the sun gear S1 and the ring gear R1 respectively. The carrier C1 supports the plurality of pinion gears P1 so that they are rotatable on their own axes, and supports the periphery of the sun gear S1 so that it can revolve. As shown in FIG. 11, the sun gear S1 is connected with the rotation shaft 18 so that it rotates integrally with the rotor 12 of the first MG 10. The carrier C1 is connected so that it rotates integrally with the output shaft 101a of the internal combustion engine 101. Further, an output shaft 107 is connected to the ring gear R1 so that it rotates integrally. The rotor 102b of the second MG 102 and the output shaft 107 are connected to the transmission mechanism 104 respectively. The transmission mechanism 104 changes speed of the rotation of the rotor 102b of the second MG 102 and transmits the rotation to the output shaft 107. The output shaft 107 is connected to driving wheels through a non-shown differential mechanism. Therefore, in the driving apparatus 100A, the driving wheels can be driven with the power from the power split mechanism 103 and the power of the second MG 102 respectively. The transmission mechanism 104 is a well-known transmission mechanism which is mounted in a hybrid vehicle, thus a detailed explanation thereof will be omitted.

In the driving apparatus 100A, by changing the rotation direction and the number of rotations of the sun gear S1 of the power split mechanism 103, the power output from the internal combustion engine 101 can be split to the first MG 10 and the output shaft 107. Therefore, a vehicle in which the driving apparatus 100A is installed is a power split type hybrid vehicle. In this case, in the first MG 10, the rotor 12 is rotated by the split power, and thereby regenerative generation is carried out. Further, by locking the sun gear S1 so that it cannot rotate, the power of the internal combustion engine 101 is transmitted as is to the output shaft 107. As explained above, since the sun gear S1 is connected to the rotor 12, the operation state of the sun gear S1 can be switched by switching the operation mode of the first MG 10.

The control apparatus 30 switches the operation mode of the first MG 10 in accordance with the running condition of the vehicle, and thereby the control apparatus 30 switches the operating condition of the sun gear S1. The control apparatus 30 also controls the second MG 102 in accordance with the running condition of the vehicle. The control method of the second MG 102 may be a publicly-known control method applied to motor generators mounted in hybrid vehicles, thus a detailed explanation thereof will be omitted. In the case that the rotating electrical machine apparatus of the present invention is applied to the driving apparatus 100A of a hybrid vehicle, the control apparatus 30 may be used together with another computer unit such as a transmission control unit which controls the driving apparatus 100A, and may also be provided exclusively for controlling the first MG 10 and the second MG 102. A vehicle speed sensor 32, which outputs a signal corresponding to the speed of the vehicle for detecting the running condition of the vehicle, and an accelerator opening sensor 33, which outputs a signal corresponding to an accelerator opening correlating to the load (drive force) of the driving apparatus 100A, and the like are connected to the control apparatus 30.

Figure 12:
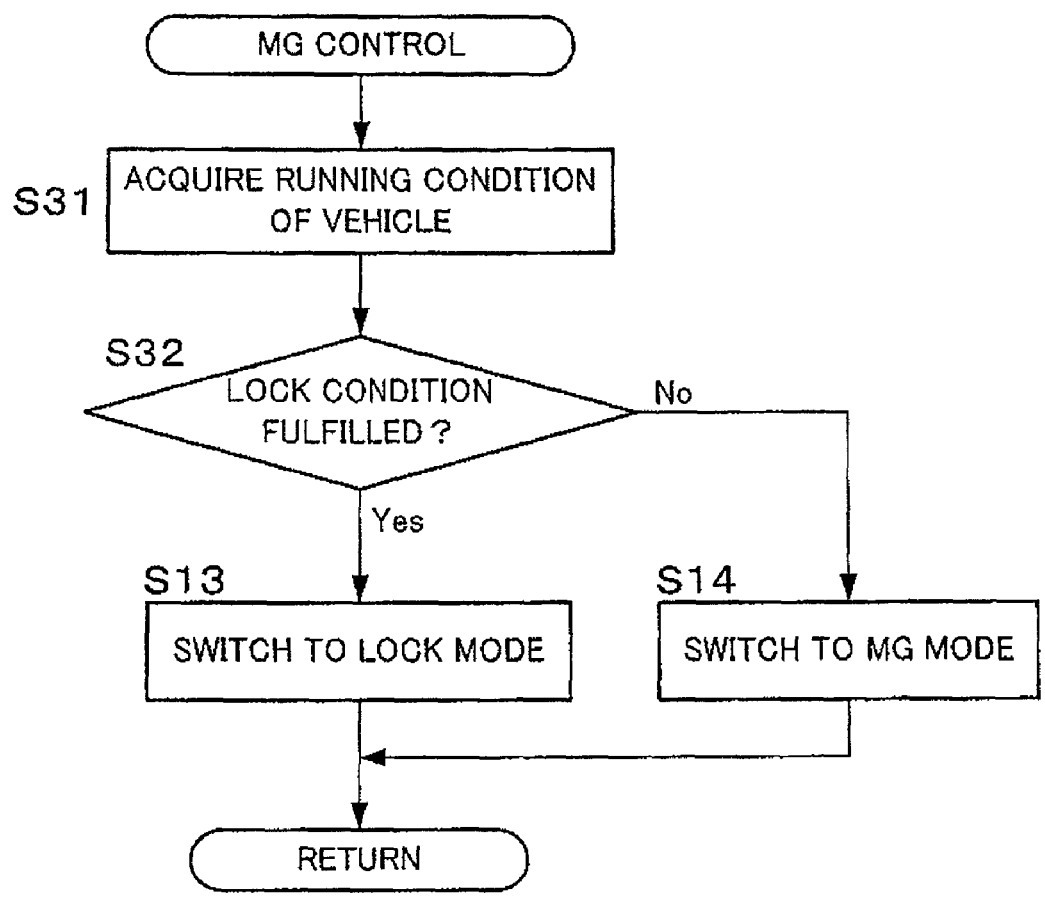
FIG. 12 is a flowchart showing a first MG control routine executed by the control apparatus of FIG. 11.

FIG. 12 shows a first MG control routine executed by the control apparatus 30 repeatedly in a prescribed period during moving of the vehicle in order that the operation mode of the first MG 10 in accordance with the running condition of the vehicle should be switched. In this control routine, the same processes in FIG. 12 as those in FIG. 8 have same reference numbers and explanations thereof will be omitted.

In the control routine of FIG. 12, first at step 531, the control apparatus 30 acquires the vehicle speed and the accelerator opening as parameters representing the running condition of the vehicle. Next, in step 532, the control apparatus 30 determines whether or not a prescribed lock condition to switch the operation mode of the first MG 10 to the lock mode is fulfilled. It is determined whether or not the lock condition is fulfilled on the basis of the running condition of the vehicle. For example, a lock area which is an operating area in which the sun gear S1 should be locked among the running condition of the vehicle is set beforehand. If the running condition of the vehicle is within this lock area, it is determines that the lock condition is fulfilled.

When the control apparatus 30 determines that the lock condition is fulfilled, the process advances to step S13, and the control apparatus 30 switches the operation mode of the MG 10 to the lock mode. Thereafter, the control apparatus 30 ends the first MG control routine. On the other hand, when the control apparatus 30 determines that the lock condition is not fulfilled, the process advances to step S14, and the control apparatus 30 switches the operation mode of the MG 10 to the MG mode. In the MG mode, the control apparatus 30 controls the inverter 3 so that the first MG 10 functions as a generator. Thereafter, the control apparatus 30 ends the first MG control routine.

In the driving apparatus 100A, the time change of the current values of the wirings U, V and W when the operation mode of the first MG 10 is switched from the MG mode to the lock mode is the same as in FIG. 7. However, in the driving apparatus 100A, the first MG 10 is made to function as a generator in the MG mode. Therefore, the time change of the current values in duration Pmg in FIG. 7 shows the time change of the current sent from the first MG 10 to the inverter 3.

Since the driving apparatus 100A includes the rotating electrical machine apparatus of the present invention, it is not necessary to provide a new mechanism for locking the first MG 10. Therefore, the structure of the driving apparatus 100A can be simplified, and it is possible to downsize the driving apparatus 100A.

Figure 13:
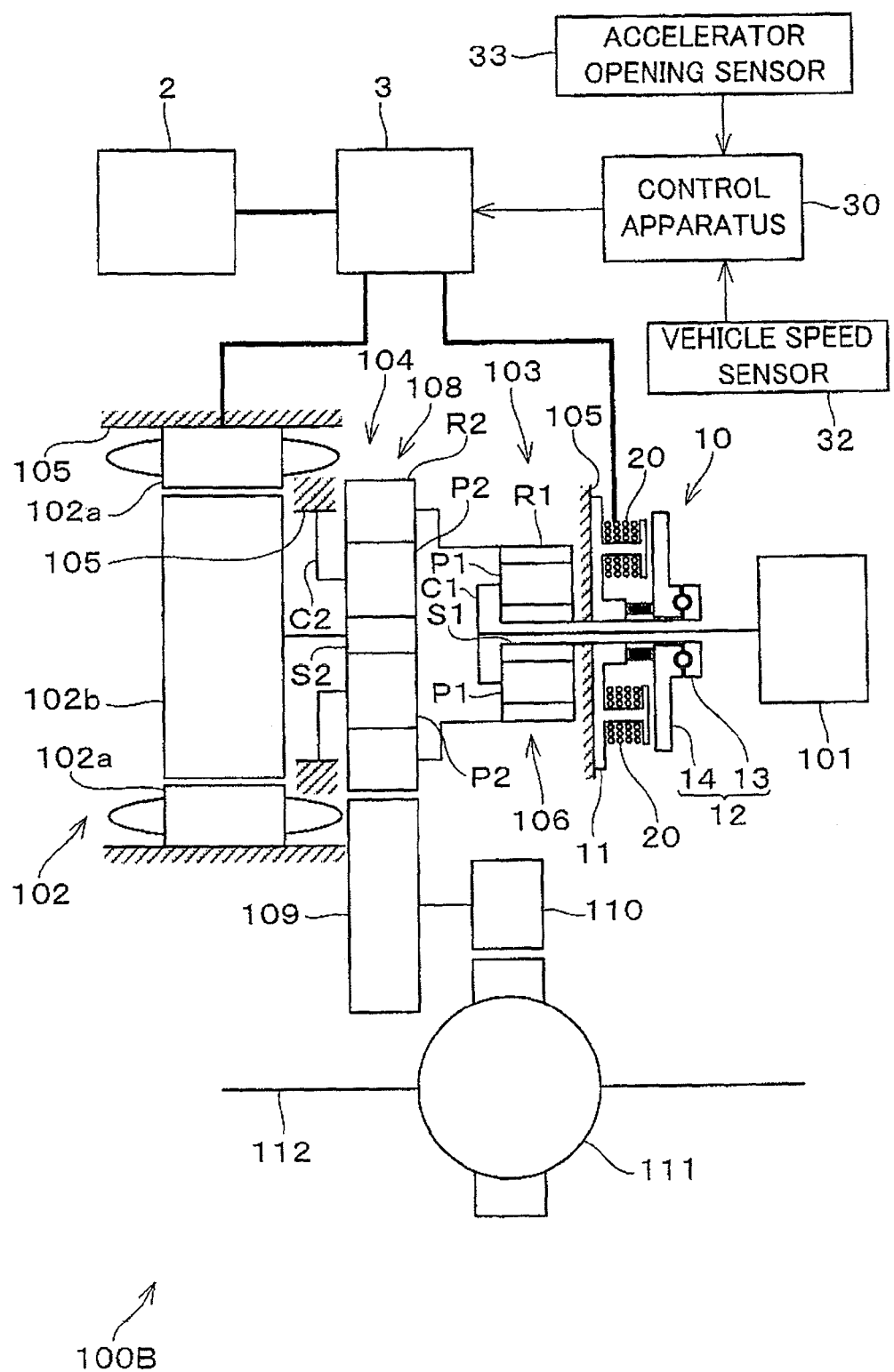
FIG. 13 is a view showing a second embodiment of a driving apparatus of a hybrid vehicle in which the rotating electrical machine apparatus of the present invention is incorporated.

Next, a driving apparatus 100B according to a second embodiment will be explained with reference to FIG. 13. In FIG. 13, the same portions in FIG. 13 as those in FIG. 11 have same reference numbers, and explanations thereof will be omitted. In the driving apparatus 100B, a planetary gear mechanism 108 is provided as the transmission mechanism 104. The planetary gear mechanism 108 includes a sun gear S2, which is an external gear, a ring gear R2, which is a gear having teeth on its inner peripheral surface and its outer peripheral surface, a plurality of pinion gears P2, and a carrier C2. The sun gear S2 and the ring gear R2 are arranged coaxially so that the teeth on the inner peripheral surface of the ring gear R and the teeth on the sun gear S2 face each other. The plurality of pinion gears P2 is disposed so that they engage with the sun gear 52 and the ring gear R2. The carrier C2 supports the plurality of pinion gears P2 so that they are rotatable on their own axes, and supports the periphery of the sun gear 52 so that it can revolve.

As shown in FIG. 13, the sun gear S2 of the planetary gear mechanism 108 is connected so that it rotates integrally with a rotor 102*b* of the second MG 102. The carrier C2 is fixed to the case 105 so that it cannot rotate. The ring gear R2 is connected so that it rotates integrally with the ring gear R1 of the power split mechanism 103.

The driving apparatus 100B also includes a counter gear 109 which engages with the teeth on the outer peripheral surface of the ring gear R2 of the planetary gear mechanism 108, and a drive gear 110 which rotates integrally with the counter gear 109. The drive gear 110 engages with a differential mechanism 111, and the differential mechanism 111 is connected via a drive shaft 112 to non-shown driving wheels. Therefore, power output from the ring gear R2 is transmitted to the driving wheels via the counter gear 109, the drive gear 110, the differential mechanism 111, and the drive shaft 112. Thus the driving wheels are driven.

In the driving apparatus 100B, by changing the rotation direction and the number of rotations of the sun gear S1 of the power transfer mechanism 103, the power output from the internal combustion engine 101 can be transferred to the first MG 10 and the ring gear R2 of the planetary gear mechanism 108. Therefore, a vehicle in which the driving apparatus 100B is installed is also a power split type hybrid vehicle.

In the driving apparatus 100B, the operation mode of the first MG 10 is switched in accordance with the running condition of the vehicle. This control method may be the same control method as that for the driving apparatus 100A of the first embodiment explained above, thus an explanation thereof will be omitted.

As explained above, in the driving apparatus 100B of the second embodiment, since the rotating electrical machine apparatus of the present invention is included, it is not necessary to provide a new mechanism for locking the first MG 10. Therefore, the structure of the driving apparatus 100B can be simplified, and it is possible to downsize the driving apparatus 100B.

Figure 14:
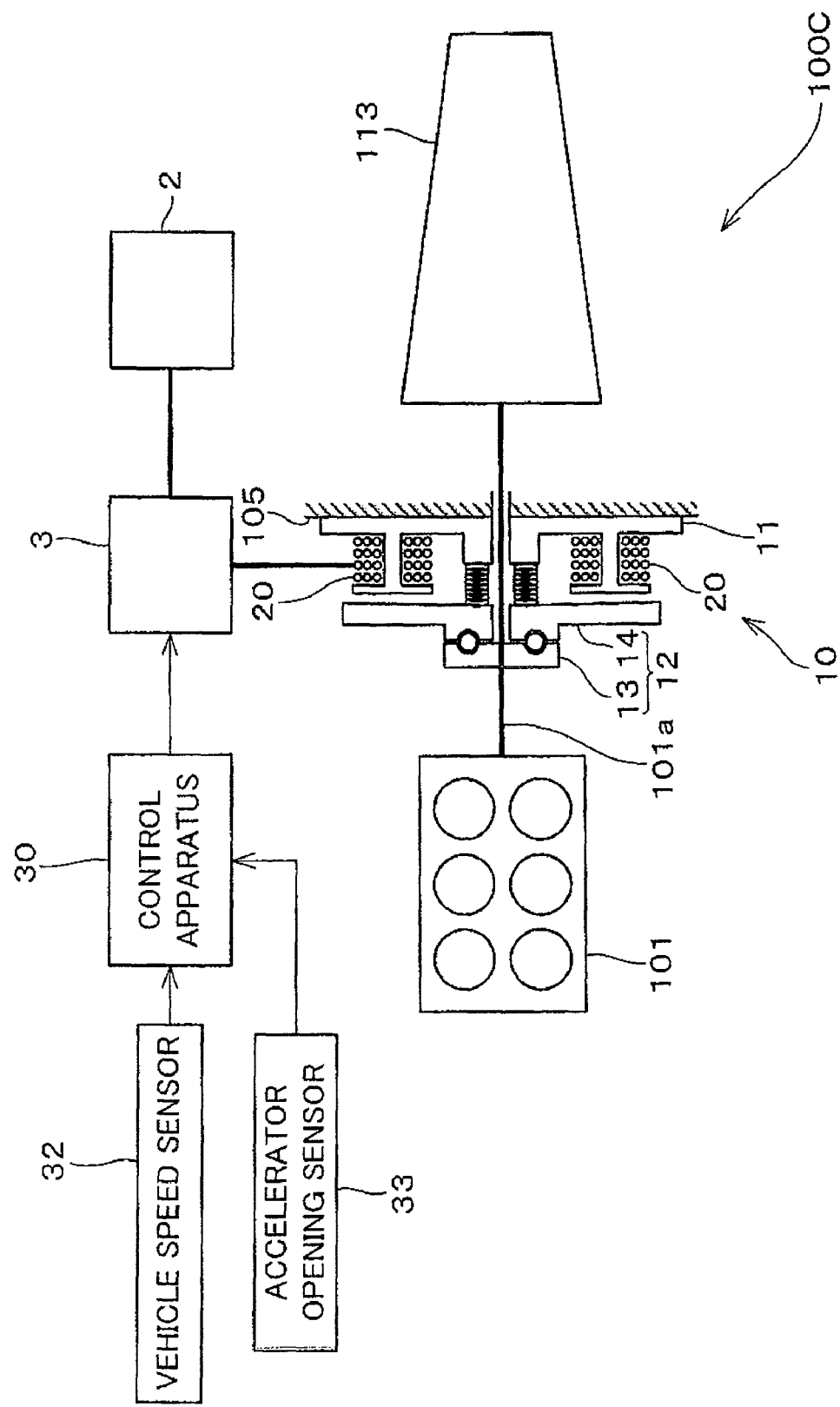
FIG. 14 is a view showing a third embodiment of a driving apparatus of a hybrid vehicle in which the rotating electrical machine apparatus of the present invention is incorporated.

FIG. 14 schematically shows a driving apparatus 100C of a third embodiment. The same portions in FIG. 14 as those in FIG. 11 have same reference numbers, and explanations thereof will be omitted. As shown in FIG. 14, in the driving apparatus 100C of this embodiment, the rotor 12 of the first MG 10 is mounted on an output shaft 101*a* of the internal combustion engine 101 so that the rotor 12 rotates integrally with the output shaft 101*a*. The rotation of the output shaft 101*a* is transmitted to the driving wheels via a transmission 113 and a differential mechanism (not shown). Therefore, in the driving apparatus 100C, the rotation shaft 101*a* is driven by both the internal combustion engine 101 and the first MG 10. Accordingly, a vehicle in which the driving apparatus 100C is installed is a parallel-type hybrid vehicle.

In the driving apparatus 100C, the operation mode of the first MG 10 is switched to the lock mode to lock the output shaft 101*a* so that it cannot rotate in the case that, for example, the vehicle should be maintained in a stopped state. In other cases, the operation mode of the first MG 10 is switched to the MG mode. In the MG mode, the first MG 10 is switched to an electric motor or a generator in accordance with the running condition of the vehicle.

In the driving apparatus 100C of the third embodiment, since the rotating electrical machine apparatus of the present invention is included, it is not necessary to provide a new mechanism for locking the output shaft 101*a*. Therefore, the structure of the driving apparatus 100C can be simplified, and it is possible to downsize the driving apparatus 100C.

Figure 15:
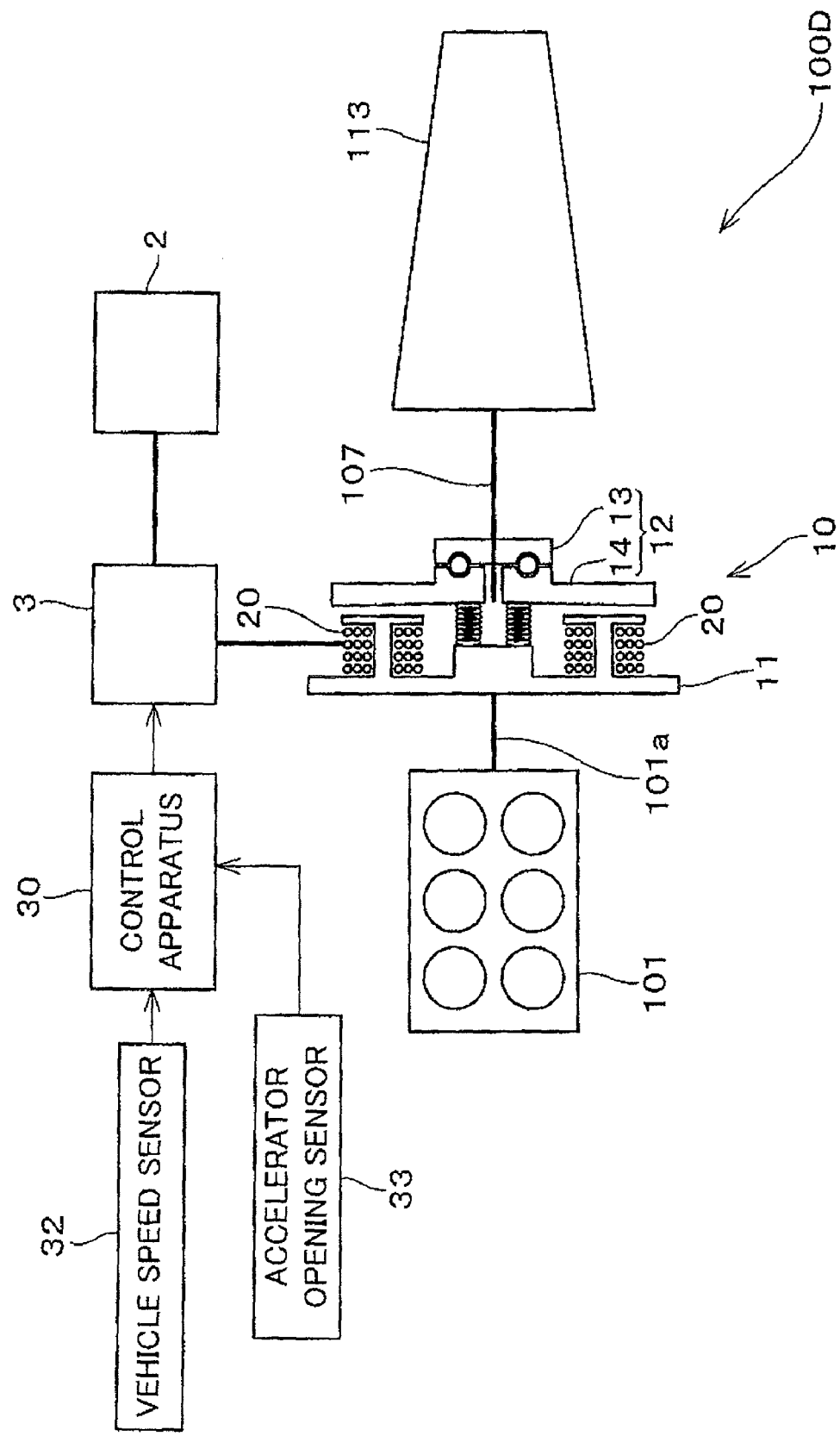
FIG. 15 is a view showing a fourth embodiment of a driving apparatus of a hybrid vehicle in which the rotating electrical machine apparatus of the present invention is incorporated.

FIG. 15 schematically shows a driving apparatus 100D according to a fourth embodiment. The same portions in FIG. 15 as those in FIG. 14 have same reference numbers, and explanations thereof will be omitted. As shown in FIG. 15, in the driving apparatus 100D of this embodiment, the stator 11 of the first MG 10 is mounted on the output shaft 101a of the internal combustion engine 101 so that the stator 11 rotates integrally with the output shaft 101a. On the other hand, the rotor 12 is mounted on the output shaft 107 so that it rotates integrally with the output shaft 107.

In the driving apparatus 100D, the operation mode of the first MG 10 is switched in accordance with the running condition of the vehicle. In the driving apparatus 100D, the operation mode of the first MG 10 is switched to the lock mode in the case that the vehicle is driven with the internal combustion engine 101. Thereby, the output shaft 101a of the internal combustion engine 101 and the output shaft 107 are connected with each other, thus the vehicle is driven with the internal combustion engine 101. On the other hand, the operation mode of the first MG 10 is switched to the MG mode in the case that the vehicle is driven with the first MG 10, and the first MG 10 is made to function as an electric motor. Thereby, the vehicle is driven with the first MG 10. In this way, in the driving apparatus 100D, it is possible to drive the vehicle with both the internal combustion engine 101 and the first MG 10. Therefore, a vehicle in which the driving apparatus 100D is installed is a parallel-type hybrid vehicle.

In the driving apparatus 100D of the fourth embodiment, by switching the operation mode of the first MG 10, the output shaft 101a of the internal combustion engine 101 and the output shaft 107 are connected and disconnected. Therefore, it is not necessary to provide a clutch mechanism. Accordingly, the structure of the driving apparatus 100D can be simplified, and it is possible to downsize the driving apparatus 100D.

The present invention is not limited to the above embodiments, and may be embodied in various modes. For example, the rotating electrical machine is not limited to an axial air gap rotating electrical machine. The rotating electrical machine may be a radial air gap rotating electrical machine in which the rotor is arranged on the inner periphery of the stator. In this case, at least a part of the rotor is constituted to be movable in the radial direction.

The alternating current supplied to the rotating electrical machine is not limited to a three-phase alternating current. A two-phase alternating current can be used, and an alternating current with four or more phases can also be used. The number of coils provided on the stator is not limited to 12. The number of coils can be appropriately changed in accordance with the diameter of the rotating electrical machine, the number of phases of the alternating current supplied to the rotating electrical machine, and the like.

The elastic force of the return spring is not limited to the strength shown in the above-described embodiments. For example, the elastic force of the return spring may be stronger than the magnetic force of one coil group and weaker than the magnetic force of three coil groups. By setting the elastic force of the return spring in this way, the rotor and the stator can be reliably separated when the rotating electrical machine is functioning as an electric motor.

The invention claimed is:

1. A rotating electrical machine apparatus comprising: a polyphase rotating electrical machine having a stator provided with a plurality of coil groups and
a rotor provided coaxially with the stator, and
a control device that controls a current supplied to the coil groups of the stator, wherein the stator having a portion facing the rotor, wherein the stator portion is provided with a stator friction portion, and
the rotor having a portion facing the stator, wherein the rotor portion is provided with a rotor friction portion,
the rotor is movable between a connection position and a separation position, wherein the connection position is defined by the stator friction portion and the rotor friction portion are in contact with each other and the rotor and the stator are connected with each other, and the separation position is defined by the stator friction portion and the rotor friction portion are separated from each other, and
the rotor is provided to move to the connection position when at least two coil groups among the plurality of coil groups are simultaneously excited, and
the control device comprises a rotor position control device that controls a current supplied to the coil groups so that at least two coil groups among the plurality of coil groups are simultaneously excited when prescribed connection condition is fulfilled.

2. The rotating electrical machine apparatus according to claim 1, further comprising a spring device that pushes the rotor in a direction away from the stator so that the rotor moves to the separation position.

3. The rotating electrical machine apparatus according to claim 2, wherein the spring device pushes the rotor in a direction away from the stator with an elastic force that is stronger than the magnetic force generated when one coil group among the plurality of coil groups is excited, and weaker than the magnetic force generated when three coil groups among the plurality of coil groups are excited.

4. The rotating electrical machine apparatus according to claim 1, wherein the polyphase rotating electrical machine is an axial air gap rotating electrical machine, wherein the stator and the rotor are aligned in a rotation axis direction of the rotor.

5. The rotating electrical machine apparatus according to claim 1, wherein the rotor comprises a connection assisting device that uses the torque in a prescribed direction generated by the rotor after the rotor moves to the connection position from the separation position to generate a force in a direction that presses the rotor friction portion to the stator friction portion.

6. The rotating electrical machine apparatus according to claim 1, wherein the polyphase rotating electrical machine is provided to a driving apparatus for transmitting power of an internal combustion engine to driving wheels of a vehicle so that a counterforce being generated for transmitting the power of the internal combustion engine to the driving wheels, and the rotor position control device determines that the prescribed connection condition is fulfilled in a case that the counterforce is equal to or greater than an upper limit value of an output of the polyphase rotating electrical machine.

7. The rotating electrical machine apparatus according to claim 6, wherein the vehicle is a parallel-type hybrid vehicle, wherein the internal combustion engine and an electric motor are installed as power sources for driving, and the driving wheels can be driven by each of the power sources.

8. The rotating electrical machine apparatus according to claim 6, wherein the vehicle is a power split type hybrid vehicle, wherein the internal combustion engine and an electric motor are installed as power sources, and the vehicle comprises a power split mechanism capable of splitting the power of the internal combustion engine to the polyphase rotating electrical machine and the driving wheels, and the driving wheels can be driven by each of the power split by the power split mechanism and the power of the electric motor.

9. The rotating electrical machine apparatus according to claim 2, wherein the polyphase rotating electrical machine is an axial air gap rotating electrical machine wherein the stator and the rotor are aligned in a rotation axis direction of the rotor.

10. The rotating electrical machine apparatus according to claim 3, wherein the polyphase rotating electrical machine is an axial air gap rotating electrical machine wherein the stator and the rotor are aligned in a rotation axis direction of the rotor.

11. The rotating electrical machine apparatus according to claim 2, wherein the rotor comprises a connection assisting device that uses the torque in a prescribed direction generated by the rotor after the rotor moves to the connection position from the separation position to generate a force in a direction that presses the rotor friction portion to the stator friction portion.

12. The rotating electrical machine apparatus according to claim 3, wherein the rotor comprises a connection assisting device that uses the torque in a prescribed direction generated by the rotor after the rotor moves to the connection position from the separation position to generate a force in a direction that presses the rotor friction portion to the stator friction portion.

13. The rotating electrical machine apparatus according to claim 2, wherein the polyphase rotating electrical machine is provided to a driving apparatus for transmitting power of an internal combustion engine to driving wheels of a vehicle so that a counterforce being generated for transmitting the power of the internal combustion engine to the driving wheels, and the rotor position control device determines that the prescribed connection condition is fulfilled in a case that the counterforce is equal to or greater than an upper limit value of an output of the polyphase rotating electrical machine.

14. The rotating electrical machine apparatus according to claim 3, wherein the polyphase rotating electrical machine is provided to a driving apparatus for transmitting power of an internal combustion engine to driving wheels of a vehicle so that a counterforce being generated for transmitting the power of the internal combustion engine to the driving wheels, and the rotor position control device determines that the prescribed connection condition is fulfilled in a case that the counterforce is equal to or greater than an upper limit value of an output of the polyphase rotating electrical machine.

\* \* \* \* \*